United States Patent [19]
Nishimura et al.

[11] Patent Number: 5,564,400
[45] Date of Patent: Oct. 15, 1996

[54] SYSTEM FOR CONTROLLING DRIVING POWER FOR A SUPERCHARGED AUTOMOTIVE VEHICLE

[75] Inventors: Eiji Nishimura; Toshihiro Matuoka, both of Hiroshima-ken, Japan

[73] Assignee: Mazda Motor Corporation, Hiroshima-ken, Japan

[21] Appl. No.: 306,724

[22] Filed: Sep. 15, 1994

Related U.S. Application Data

[63] Continuation of Ser. No. 870,622, Apr. 17, 1992, abandoned.

[30] Foreign Application Priority Data

Apr. 17, 1991 [JP] Japan ................................. 3-112538

[51] Int. Cl.⁶ .............................. F02B 39/12; F16H 59/32
[52] U.S. Cl. .......................................... 123/559.3; 477/33
[58] Field of Search ......................... 60/602; 123/559.3, 123/564

[56] References Cited

U.S. PATENT DOCUMENTS

| | | | |
|---|---|---|---|
| 4,669,441 | 6/1987 | Okimoto | 123/559.3 |
| 4,691,285 | 9/1987 | Takeda | 74/866 X |
| 5,035,160 | 7/1991 | Morita | 74/866 |
| 5,081,887 | 1/1992 | Kato | 74/866 |
| 5,089,962 | 2/1992 | Steeby | 74/866 X |
| 5,109,826 | 5/1992 | Kato | 123/564 |
| 5,125,292 | 6/1992 | Matsuoka et al. | 123/559.3 |
| 5,129,288 | 7/1992 | Sasaki et al. | 74/866 |
| 5,133,232 | 7/1992 | Kikuchi et al. | 74/866 X |
| 5,133,326 | 7/1992 | Nishimura et al. | 123/559.3 |
| 5,150,635 | 9/1992 | Minowa et al. | 74/866 |
| 5,152,192 | 10/1992 | Koenig et al. | 74/866 X |
| 5,231,582 | 7/1993 | Takahashi et al. | 74/866 X |

FOREIGN PATENT DOCUMENTS

| | | | |
|---|---|---|---|
| 60-247010 | 12/1985 | Japan | 123/559.3 |
| 61-1825 | 1/1986 | Japan | 123/559.3 |
| 2-197431 | 8/1990 | Japan | |
| 3-54322 | 3/1991 | Japan | 123/559.3 |
| 3-54321 | 3/1991 | Japan | 123/559.3 |
| 3-61651 | 3/1991 | Japan | 123/564 |

Primary Examiner—Michael Koczo
Attorney, Agent, or Firm—Fish & Richardson, P.C.

[57] ABSTRACT

A system for controlling a supply of driving power to an automotive vehicle having driving wheels and an internal combustion engine includes a supercharger, which is capable of maintaining a supercharging pressure, for charging intake air into the internal combustion engine, and an automatic transmission having a shifting characteristic including a down-shifting zone with a specified width. The automatic transmission is capable of shifting among gear stages and transmitting driving power generated by the internal combustion engine to the driving wheels. A first adjustment device controls the supercharging pressure of the supercharger to converge on a target supercharging pressure. A second adjustment device causes the automatic transmission to shift from one gear stage to another gear stage. A detection device determines an acceleration requirement level by detecting an opening angle of an accelerator pedal. A control device changes (i) the target supercharging pressure and (ii) the shifting characteristic of the automatic transmission, in accordance with the acceleration requirement level determined by the detection device such that the target supercharging pressure is lowered and the down-shifting zone of the shifting characteristic of the automatic transmission is widened when (i) the automatic transmission shifts to a higher vehicle speed gear stage and (ii) the acceleration requirement level increases.

8 Claims, 16 Drawing Sheets

SYSTEM FOR CONTROLLING DRIVING POWER FOR A SUPERCHARGED AUTOMOTIVE VEHICLE

This is a continuation of application Ser. No. 07/870,622, filed on Apr. 17, 1992, which was abandoned upon the filing hereof.

BACKGROUND OF THE INVENTION

1. Field of the Invention

The present invention relates to a system for controlling driving power for an automotive vehicle.

2. Description of the Related Art

There are several types of systems for controlling driving power for an automotive vehicle. A system in which the characteristics of the internal combustion engine change at a predetermined condition is disclosed in Japanese Patent Laid-open Publication (kokai) No. 197,431/1990. In addition, there are systems which have shifting speed stages and which combined the shifting of the speed stage with the charging at an increased pressure. These types of systems can provide high acceleration and responsiveness to acceleration when the vehicle is accelerated without charging by downshifting to a lower speed stage, for instance, to the third speed stage. On the other hand, when the charging is combined with the higher speed stage, substantially the same amount of acceleration can be produced as at the lower speed stage. Further, when acceleration is provided at the higher speed stage while the charging pressure is supplied, higher fuel efficiency is obtained than when acceleration occurs at the lower speed stage without charging pressure.

Conventional systems operate at predetermined conditions, e.g., by shifting the speed stages, for instance, on the basis of vehicle speed and angle of acceleration or by shifting between charging and non-charging on the basis of the angle of the acceleration at each speed stage. These systems, however, make the best use of those characteristics during operation, regardless of various levels of requirements for acceleration.

SUMMARY OF THE INVENTION

Therefore, the present invention provides a system for controlling driving power for an automotive vehicle adapted to accelerate the automotive vehicle accurately in accordance with a level of requirement for acceleration (hereinafter will be referred to as "acceleration requirement level") by the operator.

In order to achieve the aforesaid object, the present invention comprises a system for controlling driving power for an automotive vehicle including plural adjustment means for adjusting driving power for the automotive vehicle;

detection means for detecting a level of requiring acceleration; and control means for controlling the driving power controlling the plural adjustment means for adjusting the driving power so as to change characteristics of driving an internal combustion engine in accordance with the level of requiring acceleration detected by the detection means.

The system for controlling the driving power according to the present invention has a configuration which detects the acceleration required level from the operator and controls the plural adjustment means in order to alter or change the operating characteristics of the internal combustion engine in accordance with the acceleration requirement level. The system for controlling driving power can satisfy the demand to diversify or increase modes of changing the operating characteristics of the internal combustion engine to adapt the system for the levels of requirement for acceleration. Hence, the system for controlling driving power according to the present invention can offer acceleration accurately and carefully in accordance with the levels of requirement for acceleration by the operator.

The system according to the present invention can preferably control the automatic transmission and the supercharger in accordance with the levels of requirement for acceleration. In other words, for instance, the shifting characteristics or the characteristics of the charging pressure can be changed in accordance with the acceleration requirement levels. Hence, the system according to the present invention can offer the following advantages.

When the acceleration requirement level by the operator is large, the system for controlling the driving power according to the present invention is arranged to increase the tendency to downshift in the automatic transmission in order to increase driving power and, as a result, increase acceleration with high responsiveness to acceleration in order to satisfy the acceleration requirement level of the operator. On the other hand, when the acceleration requirement level is lower, the system for controlling driving power is arranged to decrease the tendency to downshift than when the level of requirement for acceleration is larger, while the tendency to charge intake air is increased. In this case, the acceleration is decreased to meet a lower acceleration requirement level for acceleration of the operator with less responsiveness to acceleration, while fuel efficiency is improved by reducing the number of engine revolutions. As a consequence, the system for controlling driving power according to the present invention can increase or decrease the acceleration accurately to satisfy the acceleration requirement level of the operator.

In addition, when the operator requires a higher acceleration requirement level, the system for controlling driving power according to the present invention is arranged to increase the possibilities that the speed stage is located at a lower speed stage and that the supercharger cannot charge intake air. Hence, the system for controlling driving power can satisfy the requirements when the level of requirement for acceleration by the operator is higher, that is, the requirements of high responsiveness to acceleration and better feel of acceleration by taking advantage of the features produced by the lower speed stage and no pressure to be charged by the supercharger. On the other hand, when the acceleration requirement level is lower, the system for controlling driving power can satisfy the requirements for a lower acceleration requirement level, that is, the requirements for better fuel economy. The requirement for better fuel economy is met by the advantages of the higher speed stage and the charging by the supercharger.

Other subjects, features and advantages of the present invention will become apparent in the course of the description of the preferred embodiments, which follows, with reference to the accompanying drawings.

DESCRIPTION OF THE PREFERRED EMBODIMENTS

Figure 1:
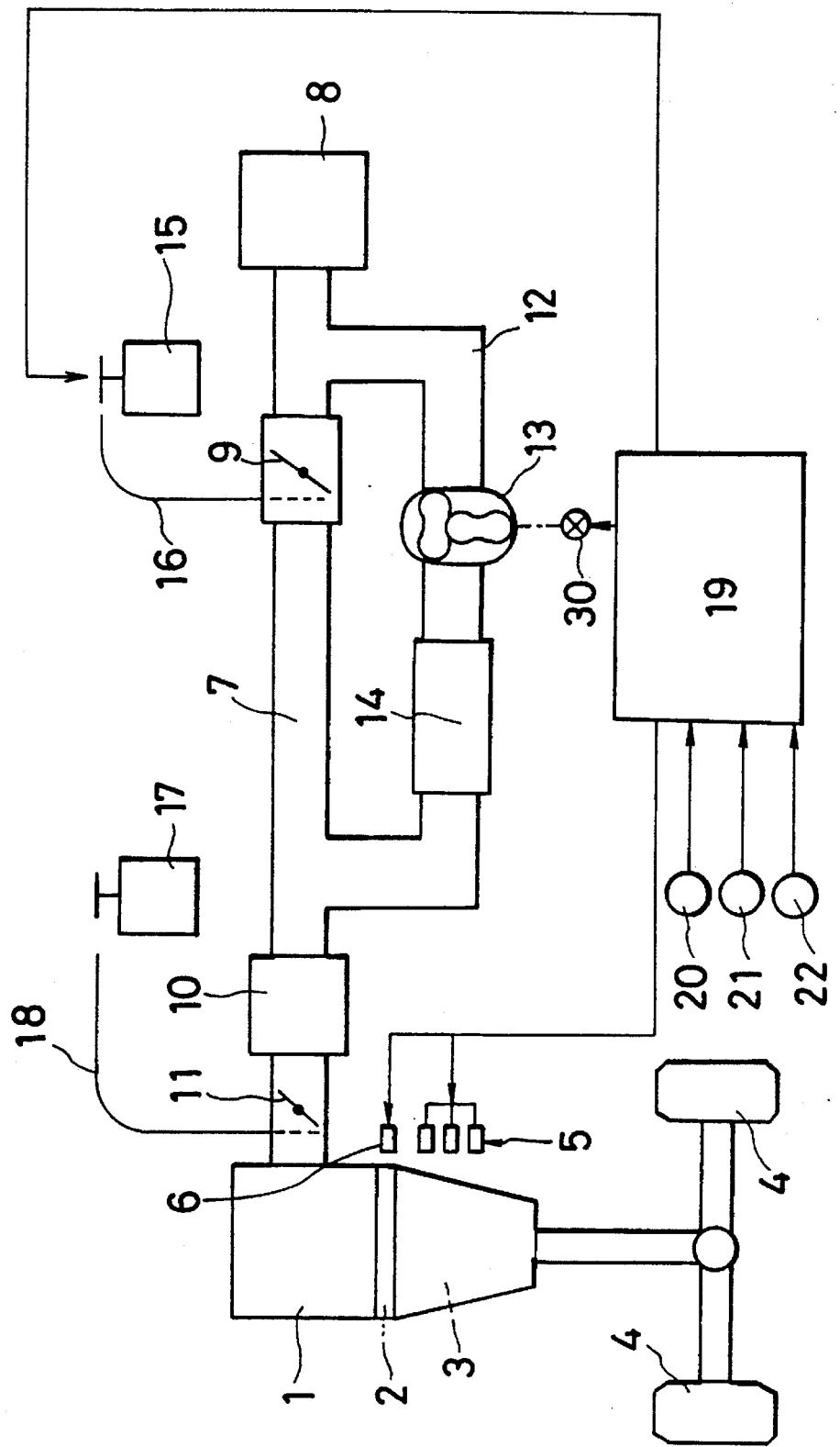
FIG. 1 is a schematic representation of the entire system according to the present invention.

As shown in FIG. 1, an internal combustion engine 1 is connected with an autocratic transmission 3 through a torque converter 2. Outputs of the internal combustion engine 1 are transmitted to driving wheels 4 through the torque converter 2 and the automatic transmission 3. The automatic transmission 3 has a shifting solenoid valve 5 and a lockup solenoid valve 6. The automatic transmission 3 may have, for example, three shifting solenoid valves 5. A combination of the solenoid valves shifts the power transmission passageway by coupling clutches disposed in the automatic transmission 3 or friction engaging elements of brakes to provide the desired speed stage, for instance, from first to fourth speed stages. The lockup solenoid valve 6 couples a lockup clutch (not shown) to couple the input side directly with the output side.

An intake passage 7 through which intake air is fed is attached to the internal combustion engine 1. The intake passage 7 has an air cleaner 8, a control valve 9 for controlling charging pressure, an airflow meter 10, and a throttle valve 11 disposed in this sequence from the upstream side to the downstream side.

On the side of the intake passage 7 there is a charging passage 12 which bypasses the control valve 9. One end of the charging passage 12 is connected to the intake passage 7 between the control valve 9 and the air cleaner 12, and the other end is connected to the intake passage 7 between the airflow meter 10 and the control valve 9. The charging passage 12 has a supercharger 13 and an intercooler 14. The supercharger 13 is driven by the internal combustion engine 1 through an electromagnetic clutch 30.

The control valve 9 is connected to an actuator 15 which controls the charging pressure through a wire 16. The throttle valve 11 is connected to an actuator 17 which controls the throttle, and the opening angle of the control valve 9 is adjusted by the actuator 15. When the control valve 9 is opened when the supercharger 13 is operating, air pressurized by the supercharger 13 is released toward the upstream side, thereby decreasing the charging pressure.

Referring to FIG. 1, reference symbol 19 denotes a control unit comprised of, for instance, a microcomputer having CPU, ROM, RAM, CLOCK and the like. The ROM stores shifting characteristics and charging characteristics as will be described hereinafter. Signals from sensor 20 for sensing the accelerator position, that is, an opening angle of the accelerator, sensor 21 for sensing vehicle speed, and sensor 22 for sensing speed stage, such as 1st, 2nd, 3rd or 4th speed stage are entered in the control unit.

A description of the processing by control unit 19 with reference to flowcharts of the accompanying drawings follows.

Figure 2:
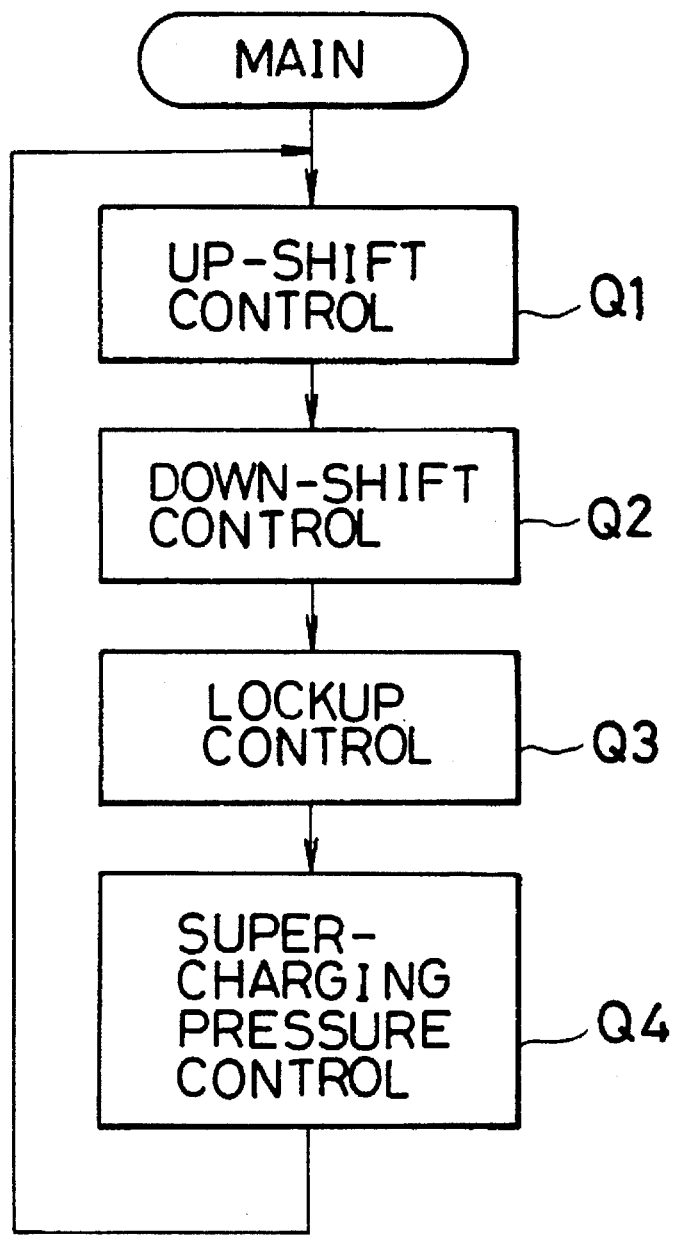
FIG. 2 is a flowchart showing a main routine according to an embodiment of the present invention.

As shown in FIG. 2, the main routine includes up-shift control at step Q1, down-shift control at step Q2, lockup control at step Q3, and control of charging pressure at step Q4.

Figure 3:
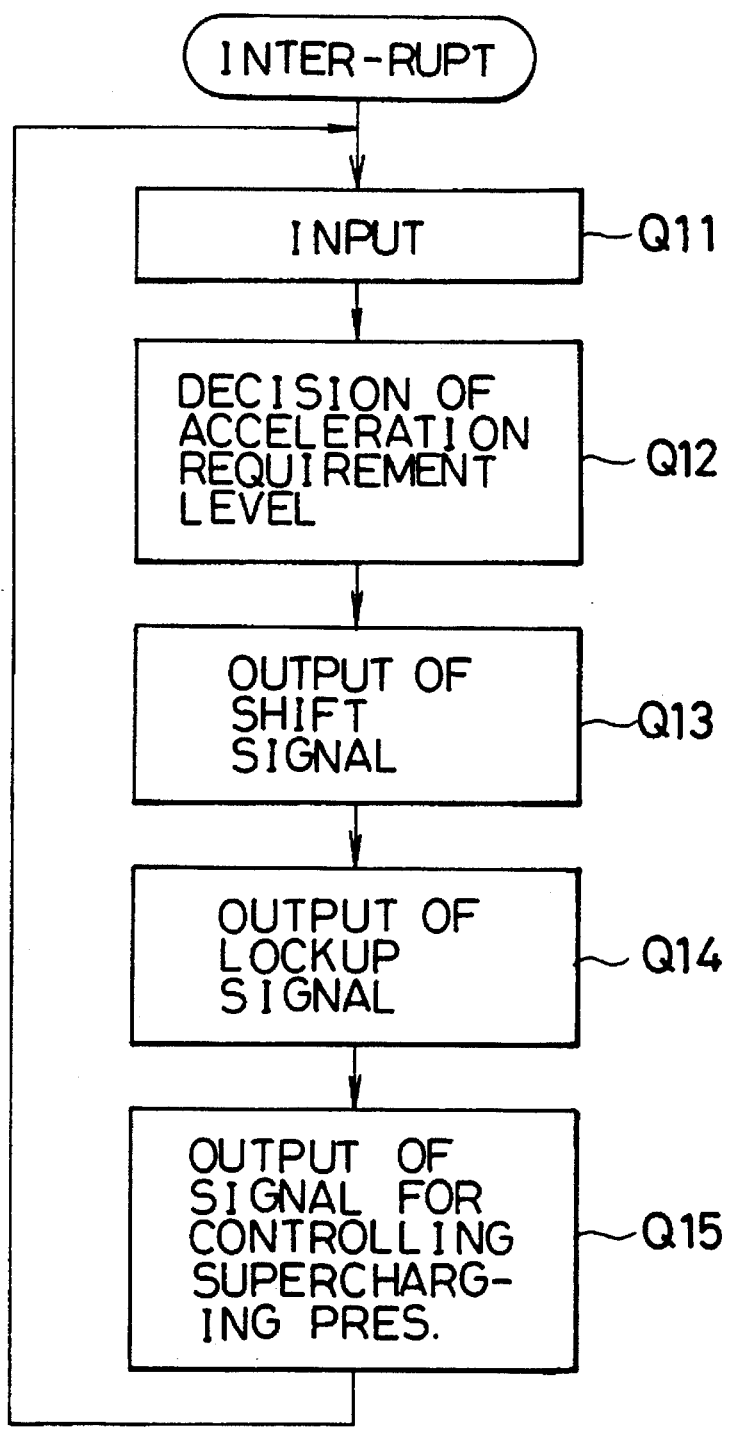
FIG. 3 is a flowchart showing an interrupt routine according to an embodiment of the present invention.

FIG. 3 is an interrupt routine which is executed at predetermined times for sequential processing various signals, e.g. speed stages G1, G2, G3 or G4, opening angle α of the accelerator pedal and vehicle speed V, from the sensors 20 to 22 at step Q11, a decision of the acceleration requirement level at step Q12, output of up-shifting or down-shifting signals at step Q13, output of lockup signals in a lockup region at step Q14, and output of signals for controlling the charging pressure to the actuator 17 at step Q15.

A detailed description of the decision made at step Q12 for determining the acceleration requirement level will be made with reference to FIGS. 4 to 7.

In this embodiment, a cruising degree y (y≦1) is detected and a level of requirement for acceleration is set as 1–y. The acceleration requirement level 1–y increases when the cruising degree y is lower, i.e. when the vehicle is in a non-cruising or state. The acceleration requirement level 1–y decreases when the cruising degree y is higher, i.e. when the vehicle is in cruising state. To determine the cruising degree y, fuzzy control is used. In this fuzzy control, a standard deviation of the opening angle of the accelerator, G, and a standard deviation of the vehicle speed, $\sigma_v$, for a 2-minute trip is used as a membership function of inputs for the fuzzy control. The cruising degree y is determined based on FIGS. 4 to 6 under fuzzy regulations (a) to (d):

(a) IF standard deviation of the opening angle of the accelerator is Small (S),
THEN cruising degree y is Big (B).

(b) IF standard deviation of the opening angle of the accelerator is Big (B),

THEN cruising degree y is Small (S).

(c) IF standard deviation of the vehicle speed is Small (S), THEN cruising degree y is Big (B).

(d) IF standard deviation of the vehicle speed is Big (B), THEN cruising degree y is Small (S).

Figure 4:
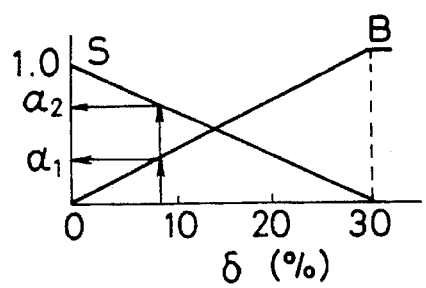
FIG. 4 is a graph showing the processing of a standard deviation of the opening angle of the accelerator in the IF clause of the fuzzy control scheme.
Figure 5:
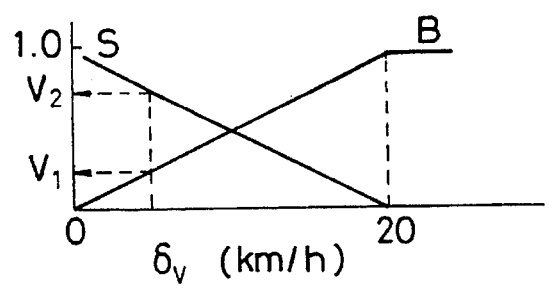
FIG. 5 is a graph showing the processing of a standard deviation of the vehicle speed in the IF clause of the fuzzy control scheme.
Figure 6:
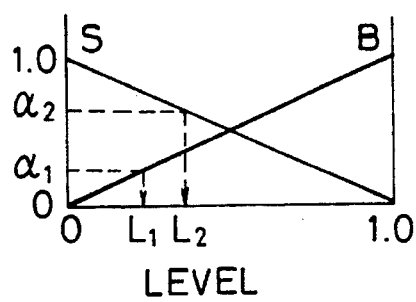
FIG. 6 is a graph showing the THEN clause of the fuzzy control scheme.
Figure 7:
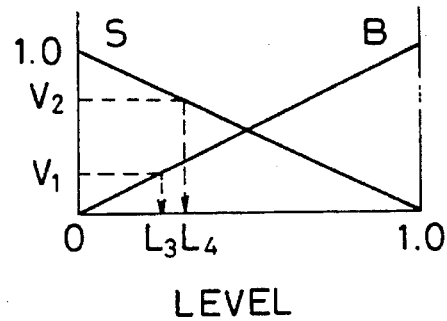
FIG. 7 is a graph showing the THEN clause of the fuzzy control scheme.

In other words, as shown in FIG. 4, membership function values α1 and α2 are determined from the standard deviation σ of the opening angle of the accelerator in the IF clauses. As shown in FIG. 5, membership function values V1 and V2 are determined from the standard deviation σ$_v$ of the vehicle speed in the IF clauses. Then, the acceleration requirement levels L1 and L2 are determined from the membership function values α1 and α2 in the THEN clauses as shown in FIG. 6, and the acceleration requirement levels L3 and L4 are determined from the membership function values V1 and V2 in the THEN clauses as shown in FIG. 7, respectively. Then, the cruising degree y is determined based on the acceleration requirement levels L1, L2, L3, and L4 by the gravity method of Formula (1):

$$y = \frac{\alpha_1 L_1 + \alpha_2 L_2 + V_1 L_3 + V_2 L_4}{\alpha_1 + \alpha_2 + V_1 + V_2}$$

In this embodiment, the vehicle is in the maximum cruising state (y=1) when the standard deviation σ=0% or when the standard deviation σ$_v$=0 km/hour. The vehicle is in the maximum noncruising state (y=0) when the standard deviation σ≧30% or when the standard deviation σ$_v$≧20 km/hour.

Figure 8:
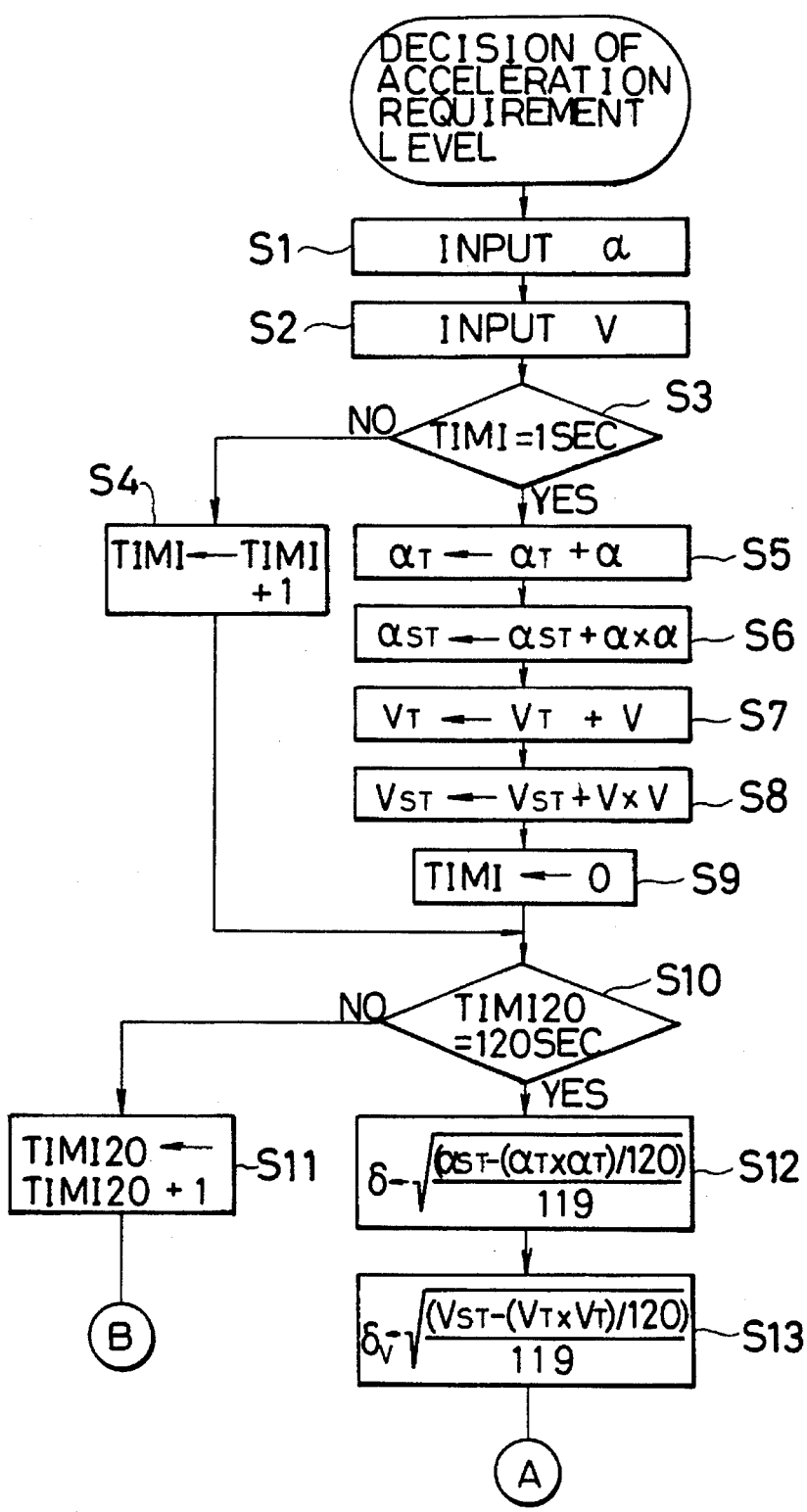
FIG. 8 is a flowchart showing an example of determining the acceleration requirement level.
Figure 9:
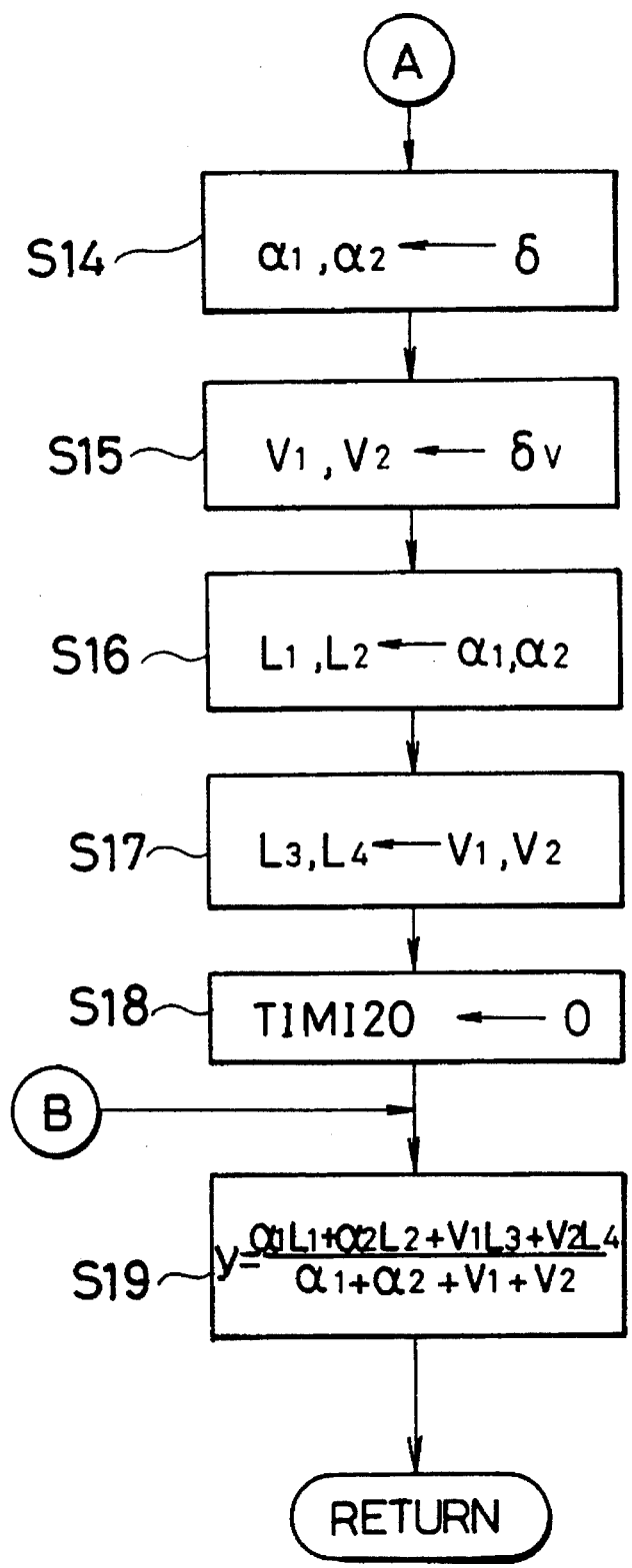
FIG. 9 is a continuation of the flowchart of FIG. 8.

The level of requirement for acceleration may be determined, for instance, every 25 milliseconds. In the flowcharts of FIGS. 8 and 9, the opening angle of the accelerator, α, is read at step S1, and the vehicle speed V is read at step S2. Then, data for the standard deviations for the opening angle of the accelerator, α$_T$ and αS$_T$, and for the standard deviation for the vehicle speed, V$_T$ and V$_{ST}$, are computed at steps S5, S6, S7, and S8, respectively, every second. After it is decided at step S10 that 120 seconds have elapsed, each of the values obtained at steps S5, S6, S7, and S8 is inserted into Formula (2) at step S12 to calculate the standard deviation for the opening angle of the accelerator, σ, and into Formula (3) at step S13 to calculate the standard deviation for the vehicle speed, σ$_v$.

Formula (2):

$$\sigma = \sqrt{\frac{\alpha_{ST} - \alpha_T \times \alpha_T}{\frac{120}{119}}}$$

Formula (3):

$$\sigma_v = \sqrt{\frac{V_{ST} - V_T \times V_T}{\frac{120}{119}}}$$

Then, the membership function values α$_1$ and α$_2$ are determined in the IF clauses from the standard deviation σ with under fuzzy control reference to FIG. 4 at step S14 and the membership function values V1 and V2 are given in the IF clauses from the standard deviation σ$_v$ under fuzzy control with reference to FIG. 5 at step S15. Thereafter, the acceleration requirement levels L1 and L2 are determined in the THEN clauses from the membership function value α$_1$ and α$_2$ under fuzzy control with reference to FIG. 6 at step S16 and the acceleration requirement levels L3 and L4 are determined in the THEN clauses from the membership function values V1 and V2 under fuzzy control with reference to FIG. 7 at step S17. Then, at step S19, the final cruising degree (level) y is determined by inserting the acceleration requirement levels L1, L2, L3 and L4 into Formula 1 (above).

In this embodiment the acceleration requirement levels (1−y) are related to the shifting signals and the signals for controlling the charging pressure, so that each of the signals take the acceleration requirement level 1−y into consideration.

Figure 11:
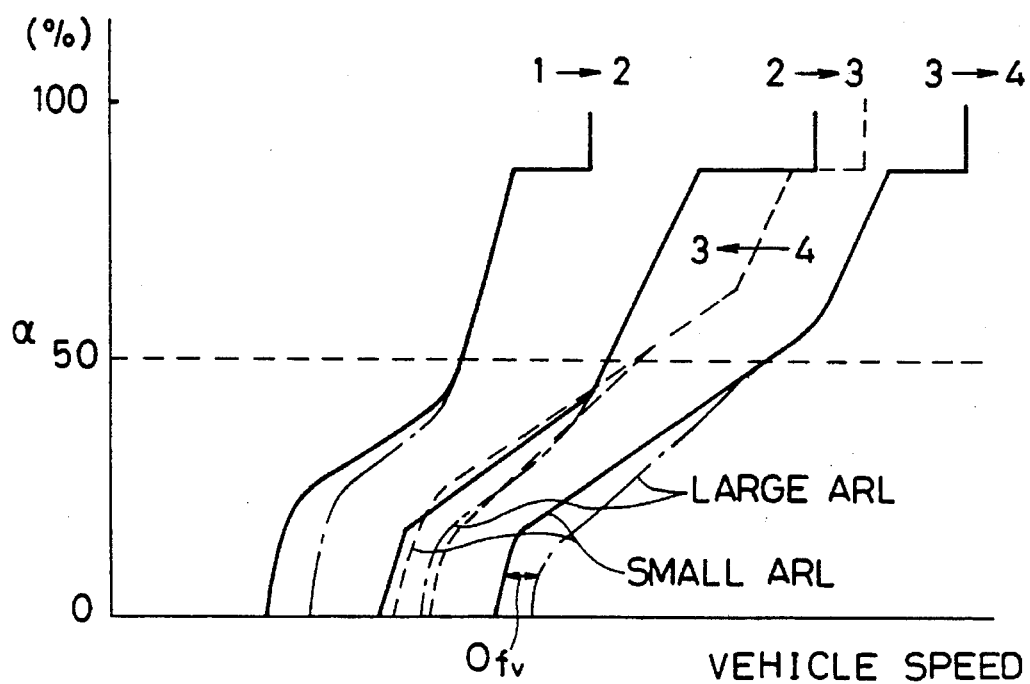
FIG. 11 is a diagram showing a shift map to be applied to the present invention.

The shifting characteristics are set as shown in FIG. 11 by employing the opening angle of the accelerator and the vehicle speed. Referring to FIG. 11 in which reference symbol "ARL" denotes the abbreviation of the acceleration requirements level, reference symbol "1→2" refers to an upshift line indicating a shift from the first speed stage to the second speed stage; reference symbol "2→3" refers to an upshift line indicating a shift from the second speed stage to the third speed stage; reference symbol "3→4" refers to an upshift line indicating a shift from the third speed stage to the fourth speed stage; and reference symbol "3→4" refers to a downshift line indicating a shift from the fourth speed stage to the third speed stage. The downshift lines from the third speed stage to the second speed stage and from the second speed stage to the first speed stage are omitted from FIG. 11 for brevity of description. Further, in this embodiment, the shift lines are arranged to change in accordance with the level of requirement for acceleration although only the shift line indicating a shift from the third and fourth speed stages is indicated.

The shifting characteristics (shifting map) change in accordance with the acceleration requirement level 1−y. The region on the side of the lower speed stage becomes wider when shifting to the higher speed stage when the acceleration requirement level 1−y is higher. Hence, if the speed stage is upshifted when the acceleration requirement level 1−y is high, the speed stage is likely to be shifted to the higher speed stage and becomes unlikely to be shifted to the lower speed stage. On the other hand, when the speed stage is to be downshifted, the speed stage is likely to be shifted to the lower speed stage, as shown the 3→4 shift line in FIG. 11. As a result, when the acceleration requirement level 1−y is large, the tendency of taking advantage of acceleration in the lower speed stage becomes stronger, thereby offering higher responsiveness to acceleration and a good feel of acceleration.

On the other hand, when the acceleration requirement level 1−y is smaller, the shifting line is shifted to the lower speed stage side, thereby expanding the region on the higher speed stage side. Hence, when the shifting line is to be upshifted, the speed stage becomes unlikely to be in the lower speed stage and likely to be shifted to the higher speed stage. To the contrary, when the shifting line is to be downshifted, the speed stage becomes unlikely to be in the higher speed stage side and likely to be shifted to the lower speed stage side. As a result, when the acceleration requirement level 1−y is lower, the tendency of taking advantage of acceleration on the higher speed stage becomes stronger, thereby satisfying the requirement in the state of the lower acceleration requirement level 1−y, that is, the requirement for ensuring high fuel economy even without higher responsiveness to acceleration.

Figure 10:
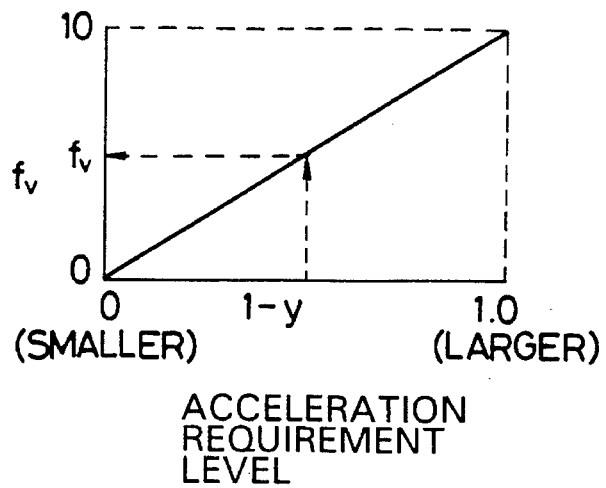
FIG. 10 is a graph showing the relationship between the correction coefficient $f_v$ and the acceleration requirement level 1–y.

The shifting signals are arranged with those things taken into account. More specifically, as shown in FIG. 10, a correction coefficient f$_v$ is first given from the acceleration requirement level 1−y, and then inserted in Formula (4):

$$O_{f_v} = 10 - f_v \times \frac{\alpha}{50}$$

The insertion of the correction coefficient f$_v$ into the Formula (4) gives an offset amount O$_{f_v}$ to a shift line (referring to FIG. 11), and a shift point is determined with the offset amount O$_{f_v}$ taken into account, thereby determining the position to which an actual vehicle speed, based on the shift point and as a result, generates a shift signal. The basic shifting line is stored in the ROM of the control unit 19 and that the basic shifting line can be altered by taking advantage of the offset amount $O_{fv}$.

In this embodiment, the alteration of the shifting line is so restricted as to be implemented in accordance with the acceleration requirement levels within the range of the accelerator's opening angle of 50% or less in accordance with the levels of requirement for acceleration, by taking a practically available region into account. When the opening angle of the accelerator exceeds 50%, the shifting line cannot be altered.

A description will now be made of outputs of the signals for controlling the charging pressure.

Figure 12:
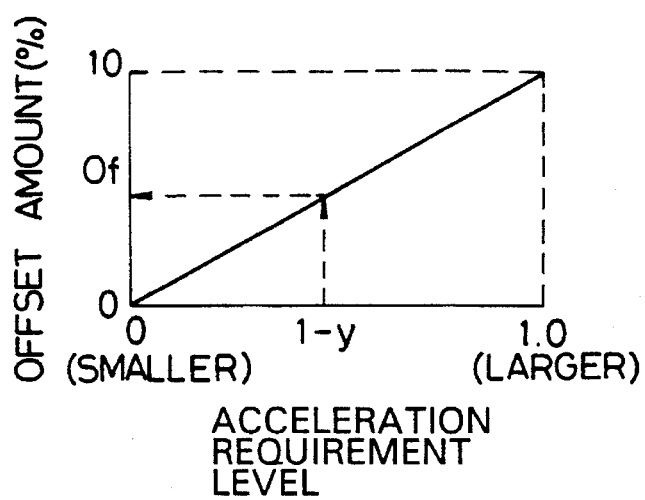
FIG. 12 is a graph showing the relationship between the ON/OFF offset amount of the supercharger, the offset amount of the charging pressure, and the acceleration requirement level.

In this embodiment, the start and the stop of the operation of the supercharger 13 as well as characteristics of the charging pressure map contain the acceleration requirement level 1–y. An ON/OFF offset amount $O_f$ of the supercharger 13 is given from the acceleration requirement level 1–y on the basis of a characteristics line as shown in FIG. 12 and added to the accelerator's opening angle $\alpha$ at which the supercharger 13 is turned on when the acceleration requirement level 1–y is lowest, i.e. 1–y=0, thereby allowing the operating region of the supercharger 13 to vary in accordance with the acceleration requirement levels 1–y.

For instance, when the acceleration requirement level 1–y is 1.0, i.e. 1–y=1.0, the ON/OFF offset amount $O_f$ of the supercharger 13 is set to 10%. In this case, for instance, in the fourth speed stage, a standard opening angle $\alpha$ of the accelerator for operating the supercharger 13 equals 40%, i.e. 30 +10(=$O_f$). This means that the supercharger 13 is arranged to not operate unless the opening angle $\alpha$ of the accelerator equals the standard accelerator's opening angle of 40% or larger. On the other hand, when the acceleration requirement level 1–y is zero, i.e. 1–y=0, the ON/OFF offset amount $O_f$ of the supercharger 13 equals to 0%. In this case, for instance, in the fourth speed stage, a standard opening angle $\alpha$ of the accelerator for operating the supercharger 13 equals 30%, i.e. 30+0(=$O_f$). Hence, as the acceleration requirement level 1–y is taken into account in turning the supercharger 13 on, it becomes harder to turn the supercharger 13 on as the acceleration requirement level 1–y becomes larger.

Figure 13:
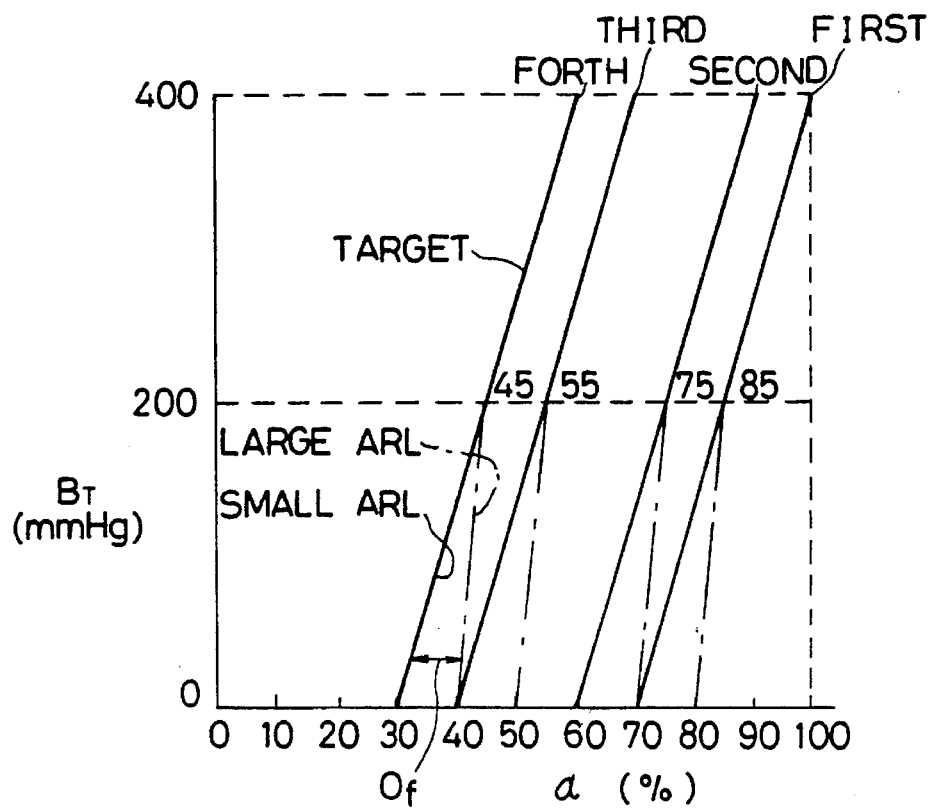
FIG. 13 is a graph showing the characteristics of the charging pressure applied to the present invention.

As shown in FIG. 13, the characteristics of the charging pressure map are divided into a practical region and a nonpractical region. The practical region is a region in which the vehicle is running at a low speed or the like. In the practical region, the gradient of a target boost ($B_T$) line of the charging pressure map is set to increase as the acceleration requirement level 1–y is increases, i.e. as the ON/OFF offset amount $O_f$ increases, so that the acceleration requirement level 1–y exerts an influence upon the target boost ($B_T$) line. In this case, for instance, the target boost ($B_T$) line for the fourth speed stage is set by Formula (5):

Formula (5):

$$B_T = \frac{200}{15 - O_f} \times \alpha - \frac{(45 + O_f) \times 200}{15 - O_f}$$

Likewise, the target boost ($B_T$) line for the third speed stage is set by Formula (6):

Formula (6):

$$B_T = \frac{200}{15 - O_f} \times \alpha - \frac{(55 + O_f) \times 200}{15 - O_f}$$

On the other hand, in the non-practical region where the operator expects acceleration approaching to the performance limits of the vehicle, the operating region of the supercharger 13 is expanded in substantially the same manner as in cases where the acceleration requirement levels are lower. In this; case, the target boost ($B_T$) line for the fourth speed stage is set by Formula (7):

Formula (7):

$$B_T = 1.33\alpha - 400$$

Likewise, the target boost ($B_T$) line for the third speed stage is set by Formula (8):

Formula (8):

$$B_T = 1.33\alpha - 533$$

A description will now be made of the flow charts of FIGS. 14 to 20 in order to clearly describe the inclusion of the acceleration requirement levels 1–y in the shifting signals and the signals when controlling the charging pressure.

Figure 14:
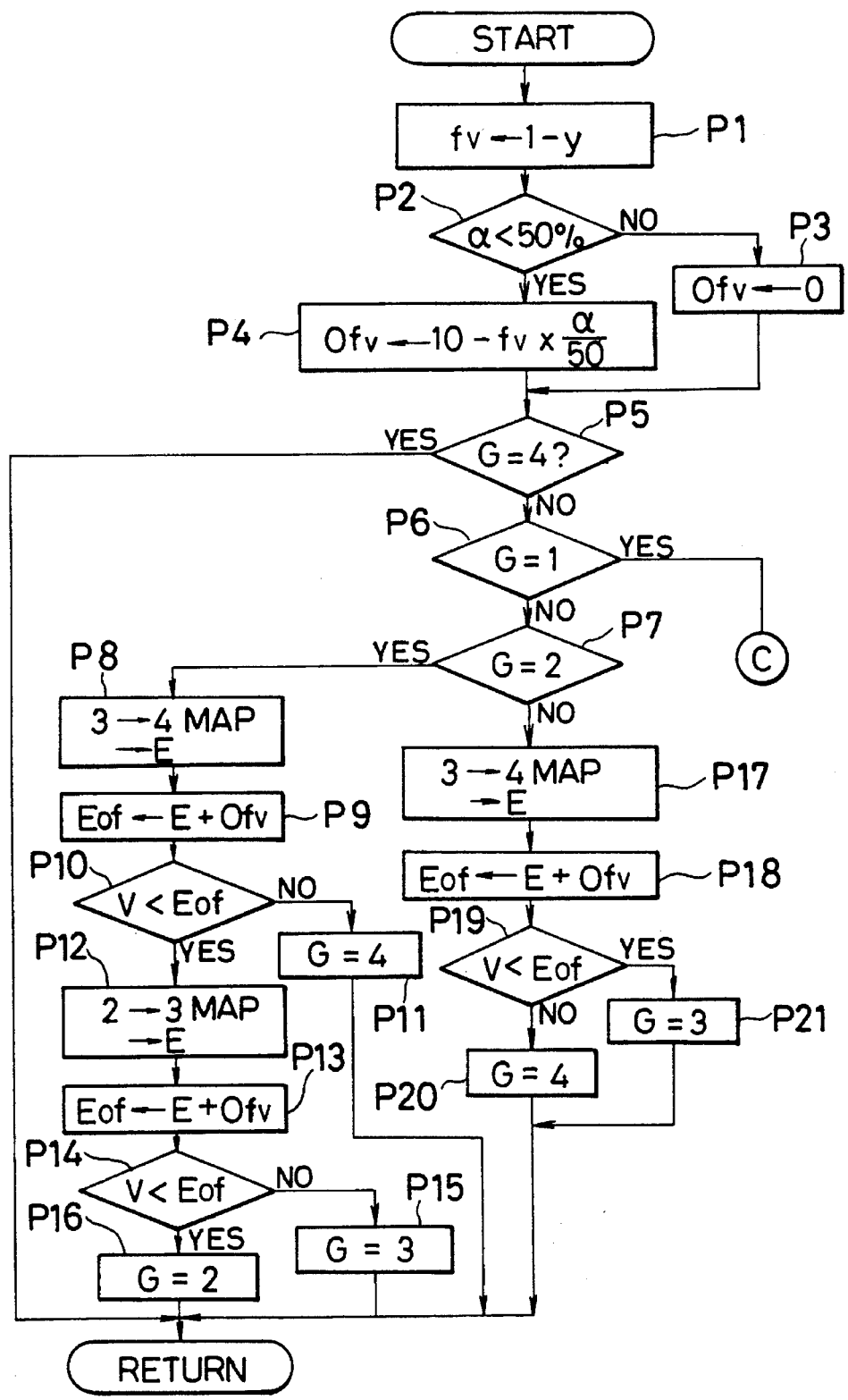
FIG. 14 is a flowchart showing signal outputs indicative of upshifting in an embodiment of the present invention.

First, a description will be made on outputs of upshifting signals with reference to the flowchart of FIGS. 14 and 15. At step P1, a correction coefficient $f_v$ is provided by the acceleration requirement level 1–y based on FIG. 10. In step P2 a decision is made to determine if the accelerator's opening angle $\alpha$ is in a region in which the acceleration requirement level 1–y is applicable. In other words, at step P2 it is determined if the accelerator's opening angle $\alpha$ is less than 50%. When the result of decision at step P2 indicates that the opening angle $\alpha$ of the accelerator is not less than 50%, then the program continues to step P3 at which the offset amount $O_{fv}$ of the shifting line is set to "0", and is followed by step P5, as will be described hereinabove. In this case, no acceleration requirement level 1–y is included. When it is decided at step P2 that the opening angle $\alpha$ is less than 50%, then the program continues to step P4 at which the offset amount $O_{fv}$ is provided by Formula (4) above, and is followed by step P5.

At step P5, a determination if the speed stage is the fourth speed stage, i.e. if G=4?, is made. When it is decided at step P5 that the speed stage is not in the fourth speed stage, i.e. G≠4, then the program continues to step P6 where a decision is made whether the speed stage is first speed stage, i.e. G=1.

When the speed stage is not the first speed stage., at step P6, then the program continues to step P7 and to determine if the speed stage is the second speed stage, i.e. G=2.

When the decision at step P7 indicates that the speed stage is the second speed stage, processing continues in steps P8 to P16, followed by return of the program. In other words, when the speed stage is the second speed stage, e.g. G=2, vehicle speed E is read from a map indicative of an up-shift from the third speed stage to the fourth speed stage, as referred to herein as "3→4 map" (at step PS), and from a map indicative of an up-shift from the second speed stage to the third speed stage, as referred to herein as "2→3 map (at step P12), in order to determine the involved speed stage by comparing an actual vehicle speed V (at steps P10 and P14). More specifically, at step P8, the vehicle speed E is read from the 3→4 map. At step P9, a reference vehicle speed $E_{of}$ is set by adding the vehicle speed E obtained at step P8 to the offset amount $O_{fv}$ obtained at step P4, including the acceleration requirement level 1–y. Then, at step P10, a decision is made whether the actual vehicle speed V is less than the reference vehicle speed $E_{of}$. If the actual vehicle speed V is less than the reference vehicle speed $E_{of}$, then the program continues to step P12 where the vehicle speed E is read from the 2→3 map. Then, at step P13, a reference vehicle speed $E_{of}$ is set by adding the read vehicle speed E to the offset amount $O_{fv}$. At step P14, a decision is made to determine whether the actual vehicle speed V is less than the reference vehicle speed $E_{of}$. If the actual vehicle speed V is less than the offset amount $O_{fv}$, then the program continues to step P16 at which the speed stage (G) is determined as the second speed stage, i.e. G=2. On the other hand, when it is decided at step P14 that the actual vehicle speed V is not less than the reference vehicle speed $E_{of}$, then the speed stage (G) is determined at step P15 as the third speed stage, i.e. G=3. Further, when the result of decision at step P10 indicates that the actual vehicle speed V is not less than the reference vehicle speed $E_{of}$, then the program continues to step P11 at which the speed stage (G) is determined as the fourth speed stage, i.e. G=4, followed by a return to the program.

When the speed stage (G) is decided as the third speed stage at steps P5 to P7, i.e. when it is decided at step P7 that the speed stage G is not the second speed stage, i.e. G≠2, then the program continues to step P17 and the vehicle speed E is read from the 3→4 map, followed by proceeding to step P18 where the reference vehicle speed $E_{of}$ is set by adding the read vehicle speed E to the offset amount $O_{fv}$, obtained at step P4. Then, at step P19, a decision is made whether the actual vehicle speed V is less than the reference vehicle speed $E_{of}$ and continues to step P20, if at step P19 the actual vehicle speed V is not less the reference vehicle speed $E_{of}$. At step P20, the speed stage (G) is determined as the fourth speed stage, i.e. G=4. On the other hand, when the result of decision at step P19 indicates that the actual vehicle speed V is less than the reference vehicle speed $E_{of}$, the speed stage (G) is determined at step P21 as the third speed stage, i.e. G=3, and is followed by a return to the program.

Figure 15:
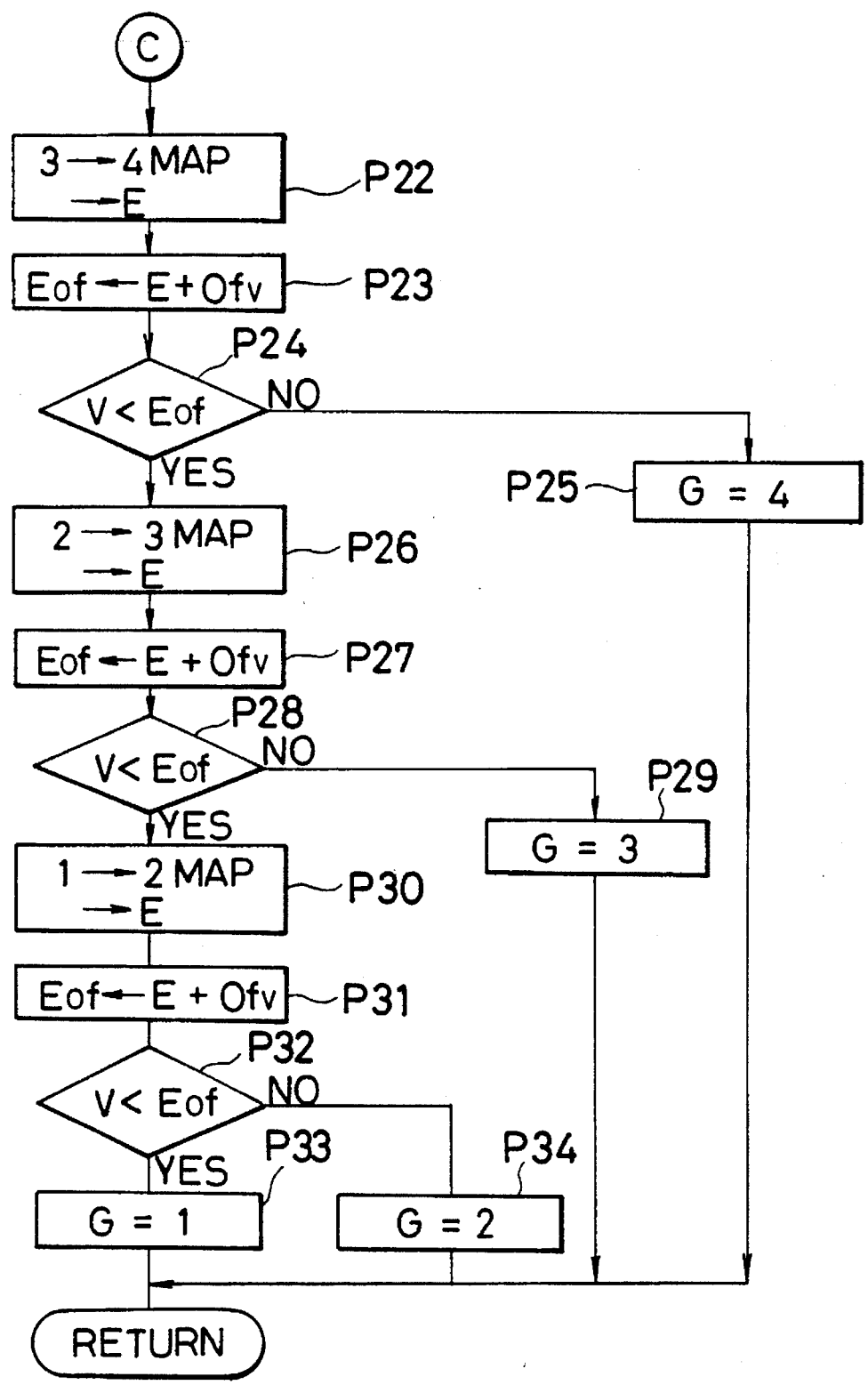
FIG. 15 is a continuation of the flowchart of FIG. 14.

When the speed stage is the first speed stage, that is, when it is decided at step P6 that the speed stage (G) is the first speed stage, i.e. G=1, then the program continues to step P22 in FIG. 15. At step P22, the vehicle speed E is read from the 3→4 map and, at step P23, the reference vehicle speed $E_{of}$ is set by adding the read speed E to the offset amount $O_{fv}$. Then, at step P24, a decision whether the actual vehicle speed V is less than the reference vehicle speed $E_{of}$. When the actual vehicle speed V is less than the reference vehicle speed $E_{of}$, then the program continues to step P26 where the vehicle speed E is read from a map indicative of an up-shift from the second speed stage to the third speed stage, as referred to herein as "2→3 map" and is followed by proceeding to step P27. Then, at step P27, the resulting vehicle speed E is added to the offset amount $O_{fv}$ to give the reference vehicle speed $E_{of}$. At step P28 it is determined if the vehicle speed E is larger than the actual vehicle speed V. When the decision at step P28 gives the affirmative result, then the program continues to step P30 and the vehicle speed E is read from a map indicative of an up-shift from the first speed stage to the second speed stage, as referred to herein as "1→2 map". Then, at step P31, the reference vehicle speed $E_{of}$ is set by adding the read vehicle speed E to the offset amount $O_{fv}$, and is followed by proceeding to step P32 at which a decision is made whether the actual vehicle speed V is less than the reference vehicle speed $E_{of}$. When the result of decision at step P32 indicates that the actual vehicle speed V is less than the reference vehicle speed $E_{of}$, then the speed stage (G) is determined as the fist speed stage, i.e. G=1, at step P33. When it is decided at step P32 that the actual vehicle speed V is not less than the reference vehicle speed $E_{of}$, then the speed stage (G) is determined as the second speed stage, i.e. G=2, step P34. Further, when it is decided at step P28 that the actual vehicle speed V is not less than the reference vehicle speed $E_{of}$, then the speed stage (G) is decided as the third speed stage, i.e. G=3, at step P29. In addition, when it is decided at step P24 that the actual vehicle speed V is not less than the reference vehicle speed $E_{of}$, then the speed stage (G) is decided as the fourth speed stage, i.e. G=4, at step P25.

Figure 16:
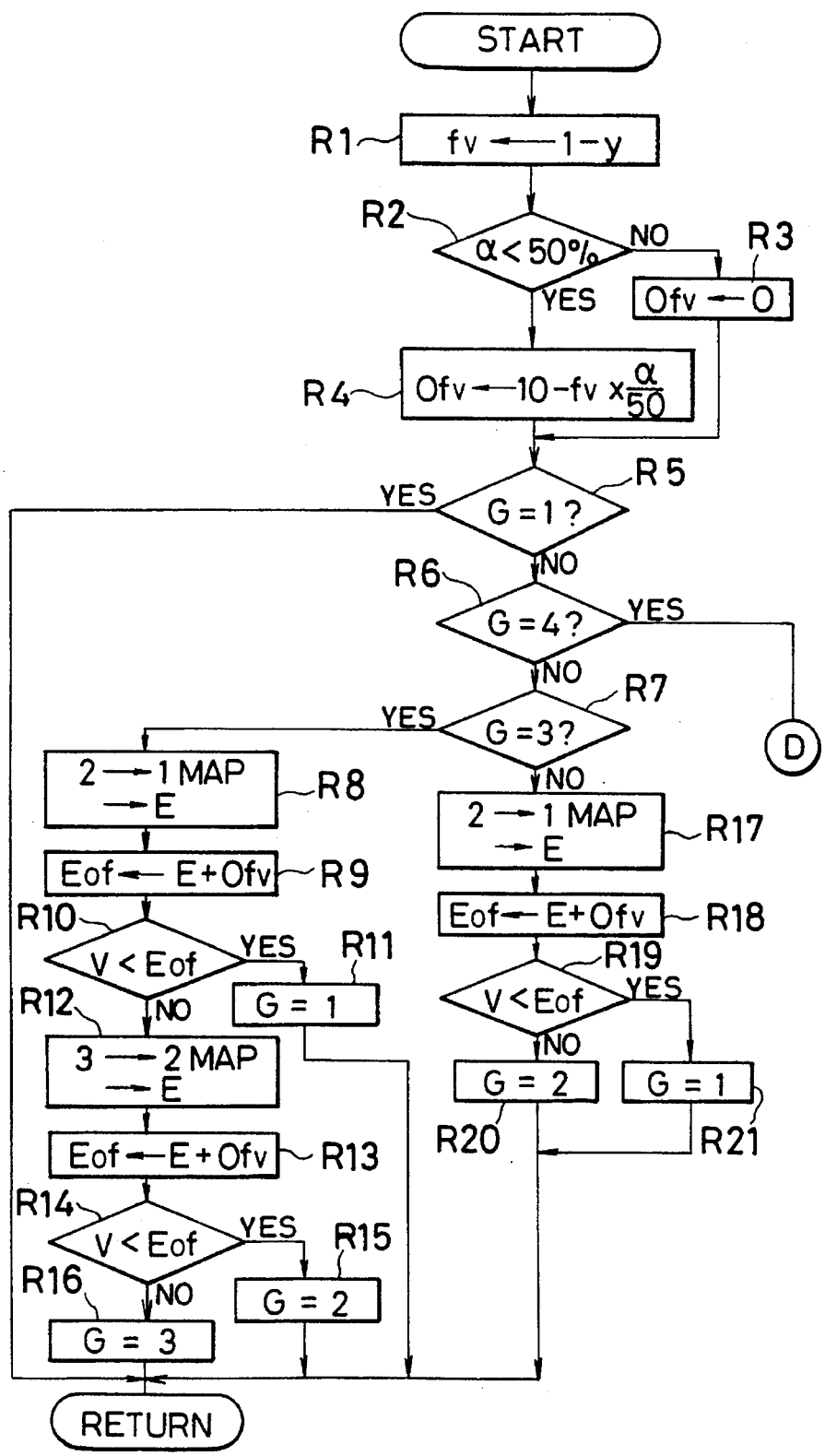
FIG. 16 is a flowchart showing signal outputs indicative of downshifting in an embodiment of the present invention.
Figure 17:
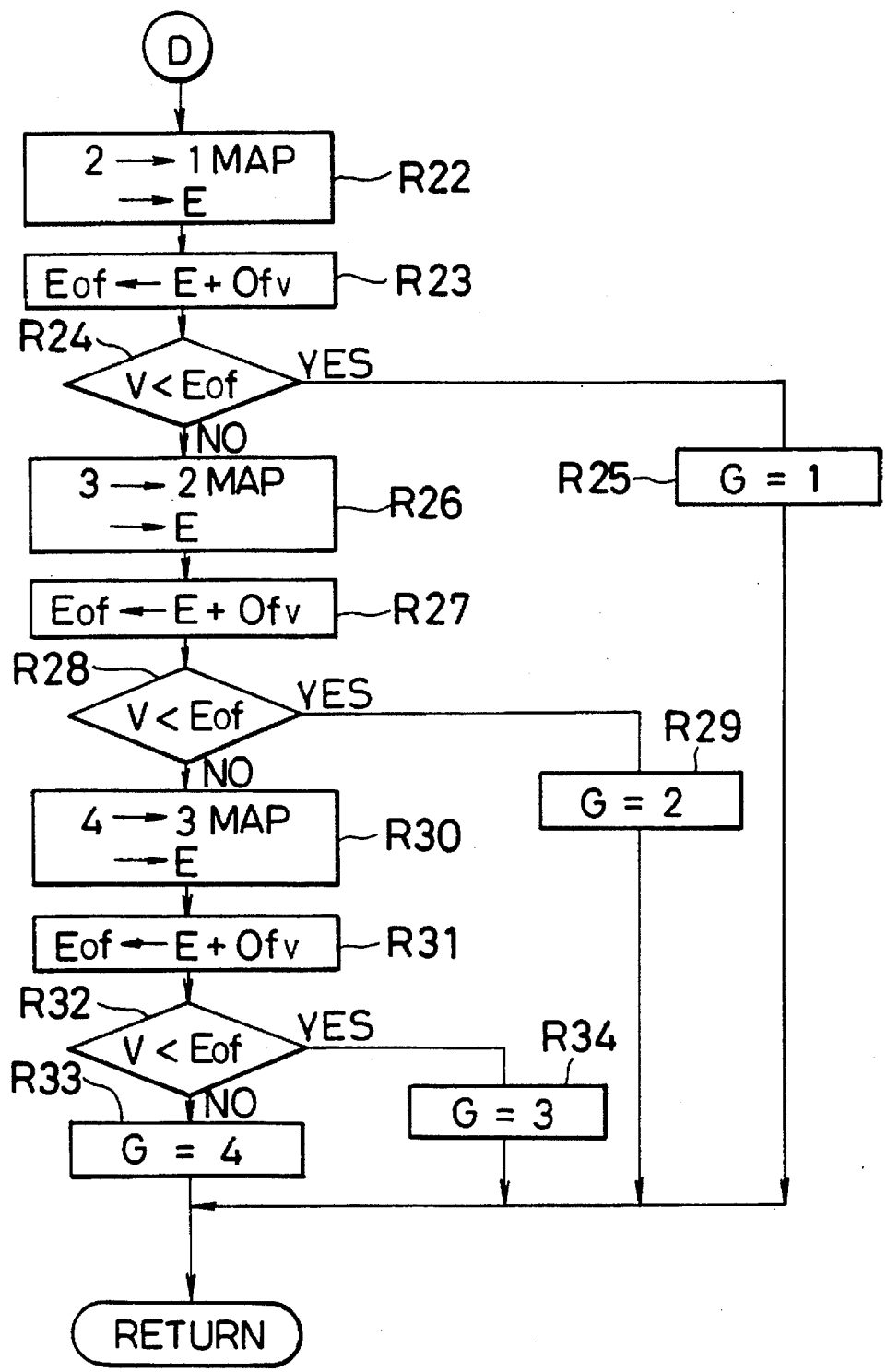
FIG. 17 is a continuation of the flowchart of FIG. 16.

A description of the outputs of downshifting signals with reference to the flowchart of FIGS. 16 and 17 follows.

At step R1, a correction coefficient $f_v$ is provided by the acceleration requirement level 1−y based on FIG. 10. At step R2 a decision is made whether the accelerator's opening angle α is in a region in which the acceleration requirement level 1−y is applicable. In other words, it is decided at step R2 whether the accelerator's opening angle α is less than 50%. When the result of decision at step R2 indicates that the opening angle α of the accelerator is not less than 50%, then the program continues to step R3 at which the offset amount $O_{fv}$ of the shifting line is set to "0" and is followed by proceeding to step R5 as will be described hereinabove. In this case, no acceleration requirement level 1−y is included. When it is decided at step R2 that the opening angle α is less than 50%, then the program continues to step R4 at which the offset amount $O_{fv}$ is provided by the Formula (4) above, and is followed by proceeding to step R5.

At step R5, a decision is made whether the speed stage is the first speed stage, i.e. if G=1?. When it is decided at step R5 that the speed stage is not the first speed stage, i.e. G≠1, then the program continues to step R6 where a decision is made whether the speed stage is a fourth speed stage, i.e. G=4. When the speed stage is not the fourth speed stage in the decision at step R6, then the program continues to step R7 at which it is determined whether the speed stage is the third speed stage, i.e. G=3.

When the result of decision at step R7 indicates that the speed stage is the third speed stage, i.e. G=3, processing for determining the involved speed stages is implemented at steps P8 to P16, followed by a return to the program. In other words, when the speed stage is decided at step R7 as the third speed stage, i.e. G=3, a vehicle speed E is read from a map indicative of the downshifting from the second speed stage to the first speed stage, as referred to herein as "2→1 map" (at step R8), and from a map indicative of the downshifting from the third speed stage to the second speed stage, as referred to herein as "3→2 map (at step R12), in order to determine the involved speed stage by comparing an actual vehicle speed V (at steps P10 and P14). More specifically, at step R8, the vehicle speed E is read from the 2→1 map, followed by step R9 at which a reference vehicle speed $E_{of}$ is set by adding the vehicle speed E obtained at step R8 to the offset amount $O_{fv}$ obtained at step R4, including the acceleration requirement level 1−y. Then, at step R10, a decision is made whether the actual vehicle speed V is less than the reference vehicle speed $E_{of}$. When it is decided at step R10 that the actual vehicle speed V is not less than the reference vehicle speed $E_{of}$, then the program flow goes to step R12 where the vehicle speed E is read from the 3→2 map. Then, at step R13, a reference vehicle speed $E_{of}$ is set by adding the read vehicle speed E to the offset amount $O_{fv}$ and, at step R14, a decision is made whether the actual vehicle speed V is less than the reference vehicle speed $E_{of}$. When it is decided at step R14 that the actual vehicle speed V is not less than the offset amount $O_{fv}$, then the program continues to step R16 at which the speed stage (G) is determined as the third speed stage, i.e. G=3. When it is decided at step R14 that the actual vehicle speed V is less than the reference vehicle speed $E_{of}$, then the speed stage (G) is determined as the second speed stage, i.e. G=2, at step R15. On the other hand., when the result of decision at step R10 indicates that the actual vehicle speed V is less than the reference vehicle speed $E_{of}$, then the program continues to step R11 at which the speed stage (G) is determined as the first speed stage, i.e. G=1.

When the speed stage (G) is decided as the second speed stage at steps R5 to R7, i.e. when it is decided at step R7 that the speed stage G is not the third speed stage, then the program continues to step R17 at which the vehicle speed E is read from the 2→1 map, followed by step R18 where the reference vehicle speed $E_{of}$ is set by adding the read vehicle speed E to the offset amount $O_{fv}$ obtained at step R4. Then, at step R19, a decision is made whether the actual vehicle speed V is less than the reference vehicle speed $E_{of}$, followed by proceeding to step R20 when it is decided at step R19 that the actual vehicle speed V is not less than the reference vehicle speed $E_{of}$. At step R20, the speed stage (G) is determined as the second speed stage, i.e. G=2. On the other hand, when the result of decision at step R19 indicates that the actual vehicle speed V is less than the reference vehicle speed $E_{of}$, the speed stage (G) is determined as the first speed stage, i.e. G=1, at step R21.

When the speed stage is the fourth speed stage, that is, when it is decided at step R6 that the speed stage (G) is the fourth speed stage, i.e. G=4, then the program continues to step R22 in FIG. 17. At step R22, the vehicle speed E is read for the 2→1 map and, at step R23, the reference vehicle speed $E_{of}$ is set by adding the read vehicle speed E to the offset amount $O_{fv}$. Then, at step R24, a decision is made whether the actual vehicle speed V is less than the reference vehicle speed $E_{of}$. When the actual vehicle speed V is decided at step R24 to be not less than the reference vehicle speed $E_{of}$, then the program continues to step R26 and the actual vehicle speed is read from the 3→2 map. Then, at step R27, the resulting vehicle speed E is added to the offset amount $O_{fv}$ to give the reference vehicle speed $E_{of}$ which in turn is compared to the actual vehicle speed at step P28. When it is decided at step P28 that the actual vehicle speed V is not less than the reference vehicle speed $E_{of}$, then the program continues to step R30 where the vehicle speed E is read from a map indicative of the downshifting from the fourth speed stage to the third speed stage, as referred to herein as "4→3 map". Then, at step R31, the reference vehicle speed $E_{of}$ is set by adding the read vehicle speed E to the offset amount $O_{fv}$, followed by step R32 at which a decision is made to determine if the actual vehicle speed V is less than the reference vehicle speed $E_{of}$. When the result of decision at step R32 indicates that the actual vehicle speed V is not less than the reference vehicle speed $E_{of}$, then the speed stage (G) is determined as the fourth speed stage, i.e. G=4, at step R33. When it is decided at step R32 that the actual vehicle speed V is less than the reference vehicle speed $E_{of}$, the speed stage (G) is determined as the third speed stage, i.e. G=3, at step R34. Further, when it is decided at step R28 that the actual vehicle speed at V is less than the reference vehicle speed $E_{of}$, then the speed stage (G) is decided, as the second speed stage, i.e. G=2, at step R29. In addition, when it is decided at step R24 that the actual vehicle speed V is less than the reference vehicle speed $E_{of}$, then the speed stage (G) is decided as the first speed stage, i.e. G=1, at step R25.

Figure 18:
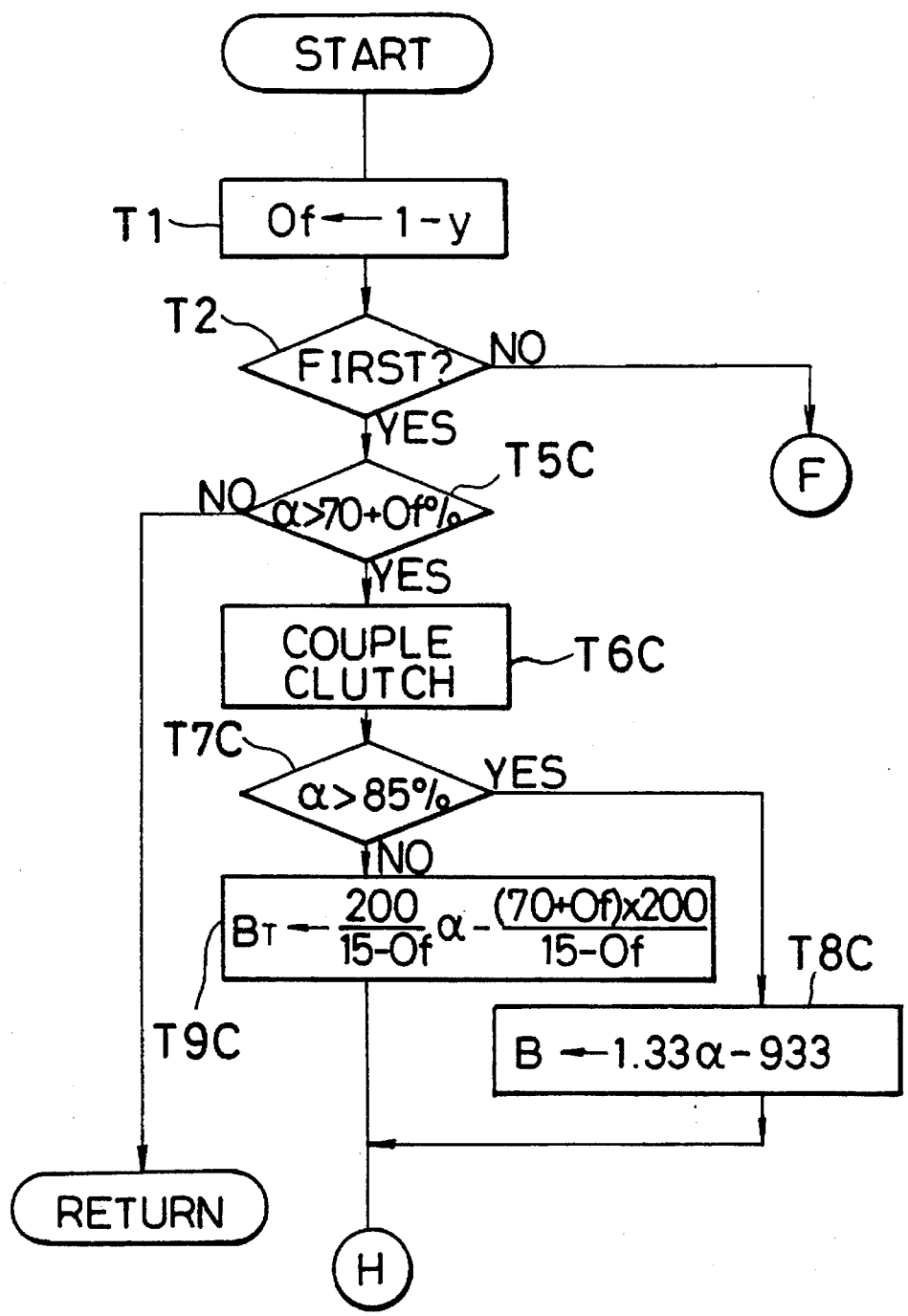
FIG. 18 is a flowchart showing signal outputs indicative of charging pressure in an embodiment of the present invention.
Figure 19:
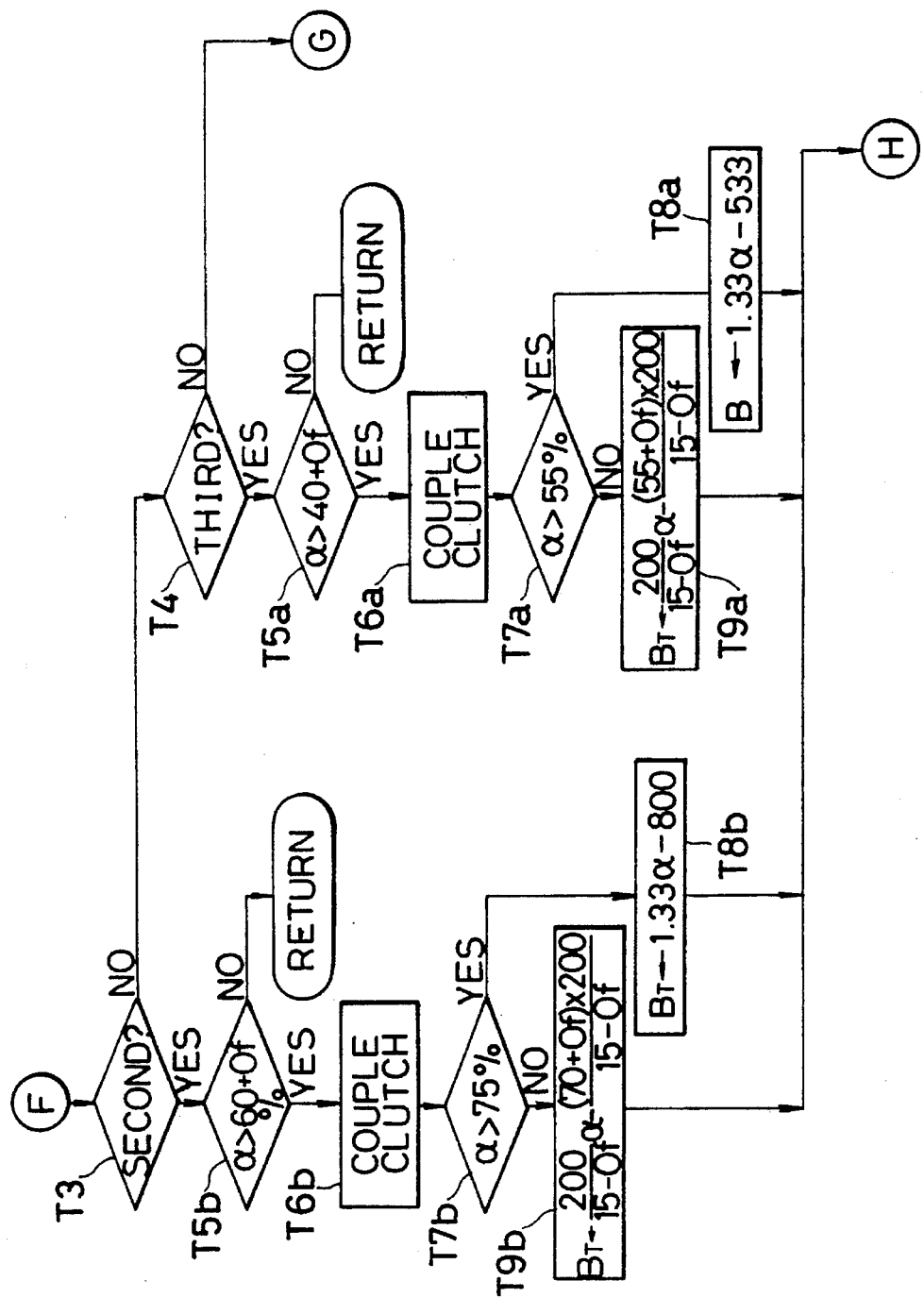
FIG. 19 is a continuation of the flowchart of FIG. 18.

A description will be made of the signals for controlling the charging pressure with reference to the flowchart of FIGS. 18 to 20.

First at step T1, the offset amount $O_f$ for charging pressure is given from the acceleration requirement level 1−y based on FIG. 12. Then, the current speed stage is decided at steps T2 (in FIG. 18) as well as T3 and T4 (in FIG. 19). When the current speed stage is determined as the fourth speed stage, then the program continues to step T5 (in FIG. 20) at which the accelerator's opening angle α for deciding the start of the stop of the operation of the supercharger 13 is compared with a reference value obtained by adding the accelerator's opening angle of 30% (determined when the target boost line n the fourth speed stage is 0 mmHg on the basis of FIG. 13) to the ON/OFF offset amount $O_f$ of the supercharger 13 obtained at step T1. The reason for using the aforesaid reference value obtained by addition of accelerator's opening angle of 30% to the ON/OFF offset amount $O_f$ as a reference for decision is adapted so as to reflect the acceleration requirement levels 1−y upon the start or the stop of the operation of the supercharger 13.

When it is decided at step T5 that the opening angle α of the accelerator is larger than the reference value, i.e. 30%+ $O_f$, that is, when it is decided that the supercharger 13 is to be turned on, an electro magnetic clutch is coupled at step T6 to allow driving power to be transmitted, and is followed by step T7 where a decision is made whether the opening angle α is larger than 45% (determined when the target boost $(B_T)$ in the fourth speed stage is 200 mmHg on the basis of FIG. 13), in order to decide if the acceleration requirement level 1−y exists in such a practical region as implementing the control by taking advantage of the level of requirement for acceleration. When it is decided at step T7 that the accelerator's opening angle α is larger than 45%, the operator is said to expect the acceleration close to the limit of the vehicle, so that the target boost $(B_T)$ is given at step T8 based on the target boost line set at the time of requiring a large extent of acceleration. That is, the target boost $(B_T)$ is determined from Formula (7) above. On the other hand, when it is decided at step T7 that the accelerator's opening angle α is equal to or less than 45%, the target boost $(B_T)$ is given in the practical region in accordance with the accelerator's opening angle α based on the target boost line that includes the offset amount $O_f$ for the charging pressure. In other words, the target boost $(B_T)$ is determined from Formula (5) above.

Figure 21:
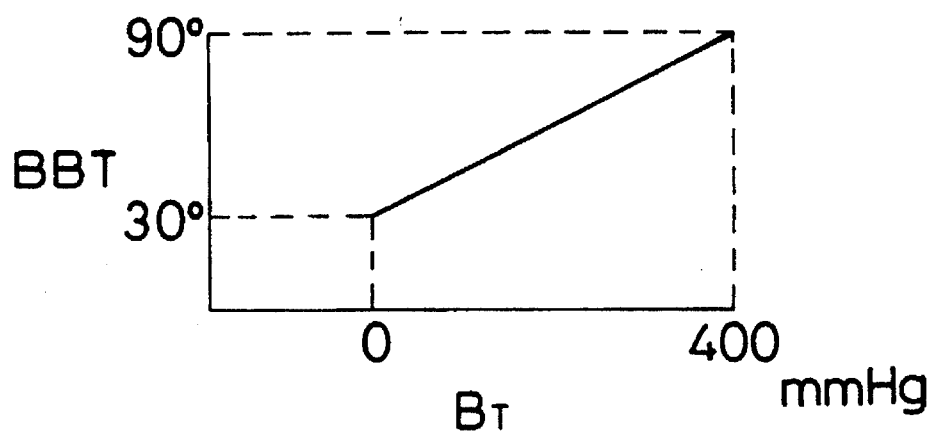
FIG. 21 is a diagram showing the relationship between an opening angle of a control valve for controlling the charging pressure and a target boost (target value).

Then, at steps T10 to T13, the target boost $(B_T)$ given at steps T8 and T9 is subjected to limit processing (an upper limit of the target boost $(B_T)$=400 mmHg, a lower limit of the target boost $(B_T)$=0 mmHg). In other words, a decision is made at step T10 to determine if the target boost $(B_T)$ is less than 0. When it is decided at step T10 that the target boost is equal to or larger than 0, on the one hand, a decision is then made at step T12 to determine if the target boost is larger than 400. When the result of decision at step T12 indicates that the target boost is not larger than 400, then the program flow goes to step T14 at which the opening angle BBT of the valve 9 for controlling the charging pressure is given on the basis of FIG. 21 in order to achieve the target boost $(B_T)$. Further, when it is decided at step T10 that the target boost is less than 0, then the target boost is set to 0 at step T11, followed by proceeding to step T14. In addition, when the result of decision at step T12 indicates that the target boost is larger than 400, then the target boost is set to 400 at step T13 and then the program continues to step T14. In this case, the opening angle BTT of the control valve 9 for controlling the charging pressure may range from 30° to 90°.

Processing is implemented in substantially the same manner as described immediately hereinabove for the first to third speed stages. A duplicate description will be omitted on processing for the first to third speed stages for the fourth speed stage by providing the program flows T5 to T8 with suffixes "a" "b" and "c" for the third, second and first speed stages, respectively.

More specifically, when it is decided at step T4 that the current speed stage is determined as the third speed stage, then a decision is made at step T5a whether the accelerator's opening angle α is larger than 40 plus $O_f$. When the decision at step T5a gives an affirmative result, the electromagnetic clutch is coupled at step T6a, and is followed by step T7a where it is determined whether the opening angle α is larger than 55%. When the opening angle α is larger than 55%, then the target boost ($B_T$) is based on Formula (8) at step T8a, and is followed by step T10 in FIG. 20. When the opening angle α is equal to or less than 55%, the target boost ($B_T$) is determined at step T9a based on Formula (6), and is followed by step T10.

Further, when it is decided at step T3 that the current speed stage is the second speed stage, i.e. G=2, then a decision is made at step T5b whether the accelerator's opening angle α is larger than 60 plus $O_f$. When the decision at step T5b is affirmative, the electromagnetic clutch is coupled at step T6b, and is followed by step T7b where it is decided whether the opening angle α is larger than 75%. When the opening angle α is decided at step T7b to be larger than 75%, then the target boost ($B_T$) is at step T8b based on Formula (9):

Formula (9):

$$B_T = 1.33\alpha - 800$$

When the opening angle α is equal to or less than 75%, then the target boost ($B_T$) is determined at step T9b based on Formula (10):

Formula (10):

$$B_T = \frac{200}{15 - O_f} \times \alpha - \frac{(70 + O_f) \times 200}{15 - O_f}$$

Figure 20:
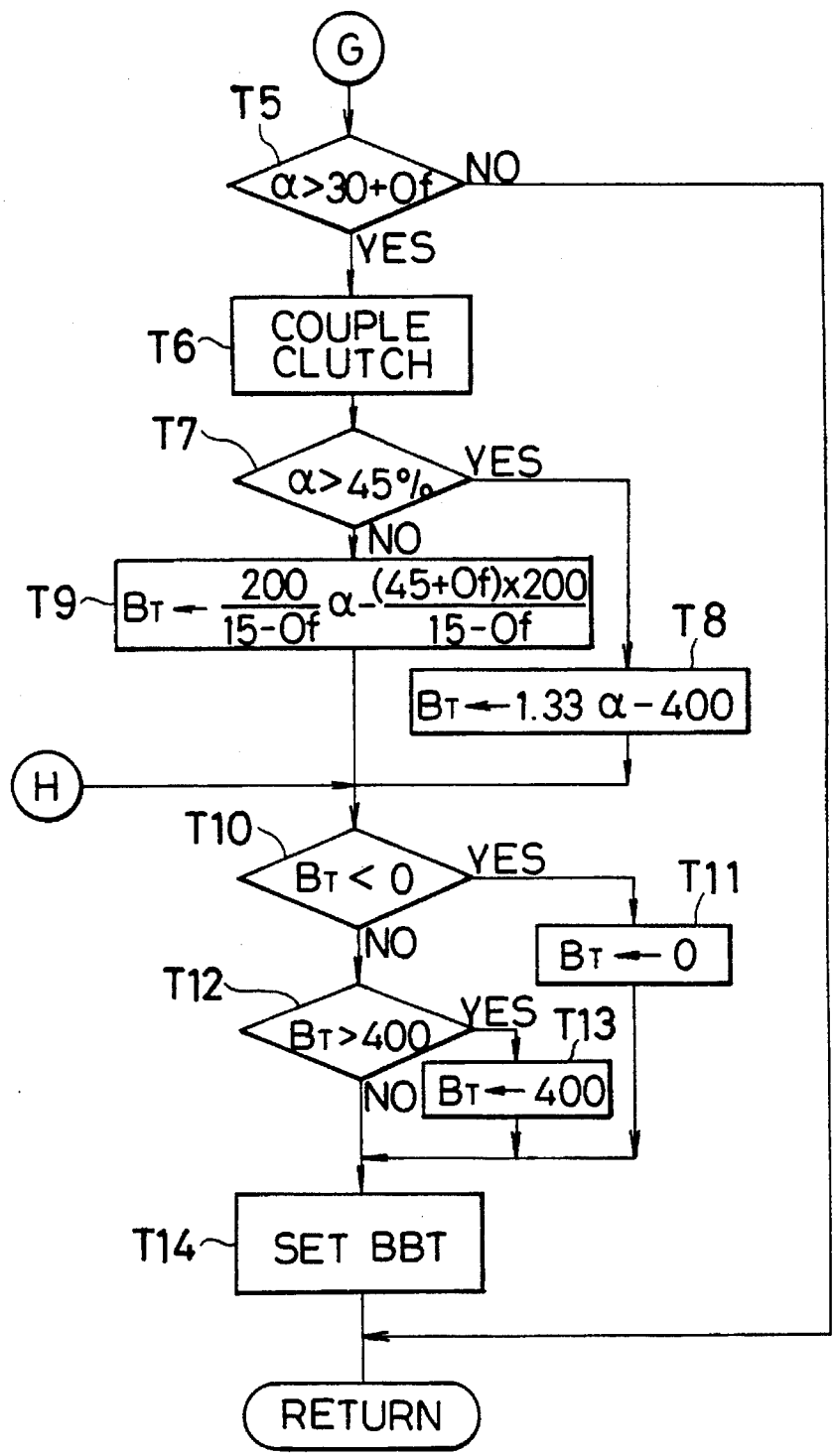
FIG. 20 is a continuation of the flowchart of FIG. 19.

The target boost ($B_T$) obtained at steps T8b and T9b is transferred to step T10 in FIG. 20.

In addition, when it is decided at step T2 that the current speed stage is determined as the first speed stage, then a decision is made at step T5c whether the accelerator's opening angle α is larger than 70 plus $O_F$. When the decision at step T5c is affirmative, the electromagnetic clutch is coupled at step T6c, and is followed by step T7c where it is decided whether the opening angle α is larger than 85%. When the opening angle α is larger than 85%, then the target boost ($B_T$) given at step T8c is based on Formula (11):

Formula (11):

$$B_T = 1.33\alpha - 933$$

When it is decided at step T7c that the opening angle α is equal to or less than 85%, the target boost ($B_T$) given at step T9c based on Formula (10) above. The target boost ($B_T$) given at steps T8c and T9c is transferred to step T10 in FIG. 20.

The system according to the present invention may use a compression ratio variable mechanism to adjust the driving power and an exhaust turbocharger. In this embodiment, although the driving power is adjusted in a continuously fashion, it can be adjusted in steps. Further, two kinds of shifting lines may be set for downshifting and upshifting and three kinds of timing for shifting the start and the stop of the operation of the supercharger may be set when the speed stage is higher, intermediate, and lower. An appropriate combination of the two kinds of the shifting lines with the three kinds of timing for shifting the start and the stop of the operation of the supercharger may be chosen in accordance with the levels of requirement for acceleration. The levels of requirement for acceleration may be set or detected in a continuous way or in a stepwise fashion. In addition, the levels of requirement for acceleration may be detected in conventional manner based on the speed at which the accelerator is depressed.

Although the present invention has been fully described in connection with the preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A system for controlling the supply of driving power to an automotive vehicle having driving wheels and an internal combustion engine, said system comprising:

a supercharger configured to charge intake air into the internal combustion engine;

adjustment means for controlling a clutch, selectively engageable with said supercharger, such that the clutch engages and activates said supercharger when a load of the internal combustion engine exceeds a predetermined engine load;

detection means for determining an acceleration requirement level by detecting an opening angle of an accelerator pedal; and control means for changing an engaging condition of the clutch in accordance with the acceleration requirement level determined by said detection means such that the predetermined engine load is increased when the acceleration requirement level increases.

2. A system according to claim 1, wherein said detection means further detects a change in the opening angle of the accelerator pedal and a change in a vehicle speed.

3. A system according to claim 2, wherein said detection means determines a cruising level at a constant speed based on detected changes in the opening angle of the accelerator pedal and in the vehicle speed; and wherein said detection means determines the acceleration requirement level based on the determined cruising level.

4. A system for controlling the supply of driving power to an automotive vehicle having driving wheels and an internal combustion engine, said system comprising:

a supercharger configured to charge intake air into the internal combustion engine;

adjustment means for controlling a clutch, selectively engageable with said supercharger, such that the clutch engages and activates said supercharger when a load of the internal combustion engine exceeds a predetermined engine load;

detection means for determining an acceleration requirement level based on a change detected (i) in an opening angle of an accelerator pedal, and (ii) in vehicle speed and control means for changing an engaging condition of said clutch in accordance with the acceleration requirement level determined by said detection means such that the predetermined engine load is increased as the acceleration requirement level increases.

5. A system as claimed in claim 4, further comprising:

first determination means for determining a correction coefficient $O_f$ in accordance with the level of requirement for acceleration detected by said detection means; and second determination means for determining an amount of a change in said condition for starting the charging by said supercharger on the basis of the correction coefficient $O_f$ determined by said first determination means.

6. A system as claimed in claim 5, wherein said second determination means is adapted to determine the amount of a change in said condition for starting the charging by said supercharger on the basis of an opening angle of an accelerator as well as the correction coefficient $O_f$ determined by said first determination means.

7. A system as claimed in claim 4, wherein:

a condition of starting the charging by said supercharger is set to be the time when an opening angle of an accelerator becomes equal to or larger than a predetermined angle; and said predetermined angle becomes larger as the level of requirement for acceleration determined by said detection means becomes higher.

8. A system as claimed in claim 4, wherein said detection means determines a cruising level at a constant speed based on changes in the opening angle of the accelerator pedal and in the vehicle speed, and wherein said detection means determines the acceleration requirement level based on the determined cruising level.

* * * * *